United States Patent [19]
Schweiter, III et al.

[11] Patent Number: 5,905,758
[45] Date of Patent: May 18, 1999

[54] FIBER-OPTIC TRANSCEIVER FOR COMBINED SERIAL DATA AND TIME CODE COMMUNICATION

[75] Inventors: Edmund O. Schweiter, III; Timothy M. Minteer, both of Pullman, Wash.

[73] Assignee: Schweitzer Engineering Laboratories, Pullman, Wash.

[21] Appl. No.: 08/637,351

[22] Filed: Apr. 24, 1996

[51] Int. Cl.⁶ ........................................ H04B 3/00
[52] U.S. Cl. ...................... 375/257; 375/219; 370/546; 359/135
[58] Field of Search .................. 385/59; 359/158, 359/135, 115, 154, 155, 159, 181, 189; 370/916, 546; 375/219, 257, 295, 316, 354, 377, 369, 370

[56] References Cited

U.S. PATENT DOCUMENTS

| | | |
|---|---|---|
| 4,395,516 | 7/1983 | Itani ........................................ 359/158 |
| 4,854,664 | 8/1989 | McCartney ................................ 385/59 |
| 4,916,689 | 4/1990 | Bielinski ................................. 359/135 |

*Primary Examiner*—Amanda Le
*Attorney, Agent, or Firm*—Jensen & Puntigam, P.S.

[57] ABSTRACT

The fiber-optic transceiver system combines EIA-232 data with IRIG-B time code information in a time multiplexing arrangement. The combined signal is transmitted to a receiver where the time code information is decombined from the data so that the two signals are replicas of their originals. The time multiplexing is accomplished by inserting a pulse into the data stream following the occurrence of a minimum time for each data bit and the coincidence of a time code pulse.

9 Claims, 7 Drawing Sheets

```
CLK     = 1    'Input:  307.2KHz
RS232   = 2    'Input:  Inverted RS232 transmit pin
IRIGB   = 3    'Input:  IRIG-B signal
CNT0    = 4    'Input:  Bit 0 from counter
CNT1    = 5    'Input:  Bit 1 from counter
CNT2    = 6    'Input:  Bit 2 from counter
CNT3    = 7    'Input:  Bit 3 from counter
CHGIN   = 8    'Input:  RC delayed from CHANGE output
OE      = 11   'Input:  Tied to ground
RESET   = 12   'Output: Resets counter
CHANGE  = 13   'Output: Active when change to RS232 signal detected
REG0    = 14   'Output: Delayed from RS232
REG1    = 15   'Output: 2 clock delays from REG0
REG2    = 16   'Output: 2 clock delays from REG1 (IRIG-B high stuffed here)
STUFF   = 17   'Output: Active from counter = 11 to counter = 1
IHIGH   = 18   'Output: Active with STUFF until pulse is stuffed if IRIG-B high
UNUSED  = 19   'Output: Unused
GND     = 10
VCC     = 20

RESET = RS232 * /REG0 * /CHGIN
      + /RS232 * REG0 * /CHGIN;

CHANGE = RESET
       + CHANGE * RS232 * /REG0
       + CHANGE * /RS232 * REG0;

REG0 /:= /RS232 * CHGIN * CNT0 * CNT1
       + /REG0 * /RS232
       + /REG0 * /CHGIN
       + /REG0 * CNT0
       + /REG0 * /CNT1;

REG1 := /REG1 * REG0 * /CNT0
      + REG1 * REG0 * /IHIGH
      + REG1 * REG0 * STUFF
      + REG1 * REG0 * /REG2
      + REG1 * /CNT0 * CNT2
      + /REG1 * REG2 * STUFF * /IHIGH;

REG2 /:= REG0 * REG1 * CNT0 * /CNT1 * /CNT2 * /CNT3 * STUFF * IHIGH
       + /REG2 * REG1 * IHIGH
       + /REG1 * CNT0 * /STUFF * /IHIGH
       + /REG2 * /REG1 * CNT3
       + /REG2 * /REG1 * /IHIGH
       + /REG1 * /CNT1 * /STUFF * /IHIGH
       + /REG1 * /CNT2 * /STUFF * /IHIGH
       + /REG2 * CNT0 * /CNT1 * CNT2;

STUFF := CNT0 * /CNT1 * CNT2 * CNT3 * REG2
       + /CNT0 * /CNT1 * CNT2 * CNT3 * /REG2
       + STUFF * CNT3
       + STUFF * /CNT0 * REG1
       + /STUFF * IHIGH * /REG0 * /REG1 * REG2;

IHIGH := /IHIGH * IRIGB * CNT0 * /CNT1 * CNT2 * CNT3 * REG2
       + /IHIGH * IRIGB * /CNT0 * /CNT1 * CNT2 * CNT3 * /REG2
       + /IHIGH * IRIGB * STUFF * CNT3
       + /IHIGH * IRIGB * STUFF * REG0 * REG1 * REG2 * /CNT0 * /CNT1
         * /CNT2 * /CNT3
       + IHIGH * STUFF
       + /IHIGH * STUFF * /REG0 * /REG1 * REG2;

UNUSED /:= 1;
```

```
CLK      = 1    'Input:  307.2KHz
FIBER    = 2    'Input:  Inverted Fiber optic input
CNT3     = 3    'Input:  Counter bit 3
CNT4     = 4    'Input:  Counter bit 4
CHGIN    = 5    'Input:  Registered delayed from CHANGE output
OE       = 11   'Input:  Tied to ground
RESET    = 12   'Output: Resets counter
CHANGE   = 13   'Output: Active when change to FIBER signal detected
CHG0     = 14   'Output: Change count 0
CHG1     = 15   'Output: Change count 1
CHG2     = 16   'Output: Change count 2
RS232    = 17   'Output: RS232 output
PULSE    = 18   'Output: Activ when IRIG-B pulse received
IRIGB    = 19   'Output: Iverted IRIG-B output
GND      = 10
VCC      = 20

RESET = /FIBER * /RS232 * /CHGIN
      + FIBER * RS232 * /CHGIN;

CHANGE = RESET
       + CHANGE * /FIBER * /RS232
       + CHANGE * FIBER * RS232;

CHG0 := CHGIN * /CHG1 * /CHG2;

CHG1 := CHGIN * CHG0
      + CHG1 * CHGIN * /CHG2;

CHG2 := CHGIN * /CHG0 * CHG1;

RS232 := /FIBER * CHANGE * /CHG0 * /CHG1 * CHG2
       + RS232 * /FIBER
       + RS232 * /CHANGE
       + RS232 * CHG0
       + RS232 * CHG1
       + RS232 * /CHG2;

PULSE := /CHANGE * CHG1 * /FIBER * RS232
       + /CHANGE * CHG1 * FIBER * /RS232
       + /CHANGE * CHG2 * /FIBER * RS232
       + /CHANGE * CHG2 * FIBER * /RS232
       + PULSE * /CHANGE
       + PULSE * CHG0
       + PULSE * CHG1
       + PULSE * /CHG2;

IRIGB := /PULSE * CHGIN * /CHG0 * /CHG1 * CHG2
       + CNT3 * CNT4
       + IRIGB * CHGIN
       + IRIGB * /CHG1 * /CHG2
       + IRIGB * /FIBER * /RS232
       + IRIGB * FIBER * RS232;
```

FIBER-OPTIC TRANSCEIVER FOR COMBINED SERIAL DATA AND TIME CODE COMMUNICATION

TECHNICAL FIELD

This invention relates generally to communication of data and time code information between various electronic devices, and more specifically concerns such a system which combines data and time code on a single channel.

BACKGROUND OF THE INVENTION

Asynchronous communication between various electronic devices, including computers and various peripheral devices, is well known. Such communication is used in a wide variety of technical fields, including specifically relative to this application, communication between two protective relays on a power transmission or distribution line.

In asynchronous communication, which typically uses the EIA-232 (previously RS-232) electrical standard involving the ASCII communication format, the transmitter produces a ground-referenced signal and the receiver measures the signal against ground. The internal clocks of the transmitter and receiver are not synchronized. Metallic cable connects the transmitter and receiver (typically this distance will be less than 50 feet), including at least one wire to transmit the data, one wire to receive data and one ground wire. The transmitted data characters are typically encoded in seven or eight bits, using the ASCII standard. The sequence of data transmission typically includes a start pulse, seven or eight data pulses and a stop pulse.

In certain circumstances, including communication of data, such as for the example given above with respect to protective relays for power systems, time code information is also transmitted between the relays so that the time clocks in the relays and peripheral devices can be synchronized. One time code which is well known and widely used is the IRIG-B time code standard. Under the IRIG-B standard, the demodulated time code is a series of pulses which occur at a 100 pulse per second rate, with the pulse widths being two, five or eight milliseconds. The widest pulses are used to indicate the start and end segments of the transmission of the code, while the narrower pulse widths represent particular binary states. The leading edges of the pulses occur in 10 millisecond intervals, so that the time can be synchronized to 10 milliseconds or better.

When both data and time code information are transmitted, a single metallic cable can be used, although two separate connectors must be used for the data and time code information In some cases, two separate cables are used.

The connecting cables are frequently metallic, which presents a hazard, particularly in high voltage situations. Accordingly, fiber-optic type transmission is being increasingly used to provide the desired electrical isolation. However, in those situations where both time code and data are to be transmitted, those two information streams must be combined in some way or separate fiber-optic cables must be used. Relative to the possibility of combining the information, it is desirable to maintain the existing EIA-232 ASCII and IRIG-B formats, because of their conventionality, and also to use only one channel, if possible.

The two information signals could be combined using conventional multiplexing; however, this would likely be too complex and would require additional hardware, adding to system expense.

The present invention is a multiplexing system sing a single fiber-optic channel, but is relatively simple to implement, without much, if any, additional hardware cost.

DISCLOSURE OF THE INVENTION

Accordingly, the present invention is a transceiver for use with a fiber-optic communication means for communication of data and time code information, comprising means for at least one of the following (a) transmitting combined data and time code information over a fiber-optic communication means and (b) receiving combined data and time code information from the fiber-optic communication means; wherein the transmitting means includes means for combining the data and time code information prior to transmission, the data having a baud rate substantially less than the channel capacity and further includes means for receiving data from the fiber-optic communication means; and wherein the receiving means includes means for separating the received combined data and time code information into replica versions of transmitted data and time code information, and further includes means for transmitting data over the fiber-optic communication means.

DESCRIPTION OF THE DRAWINGS

FIG. 5 is a set of logic equations used in the apparatus of FIG. 3.

BEST MODE FOR CARRYING OUT THE INVENTION

As indicated above, the present invention is particularly useful for communication between protective relays used on a power system, and the following explanation is in that context. However, it should be understood that the present invention can be useful in other applications as well. The invention is particularly useful where communication of two different kinds of signal information, such as the well known EIA-232 data format and the IRIG-B time code, is desired over a single channel. While the channel in the present invention is a fiber-optic channel, it should be understood that communication channels other than fiber-optic can be used with the system of the present invention.

Figure 1:
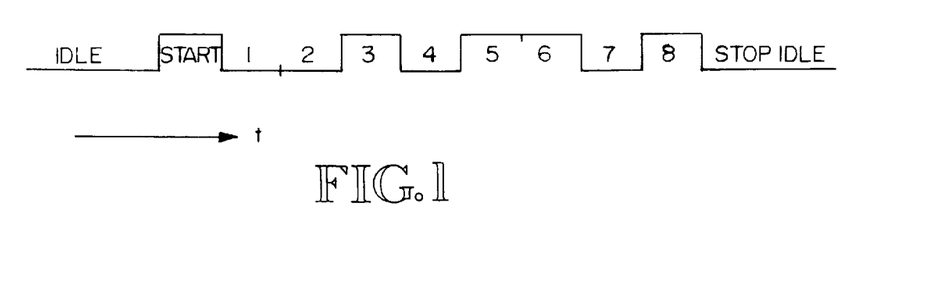
FIGS. 1 and 2 are timing diagrams showing the basic multiplexing concept of the present invention.
Figure 2:
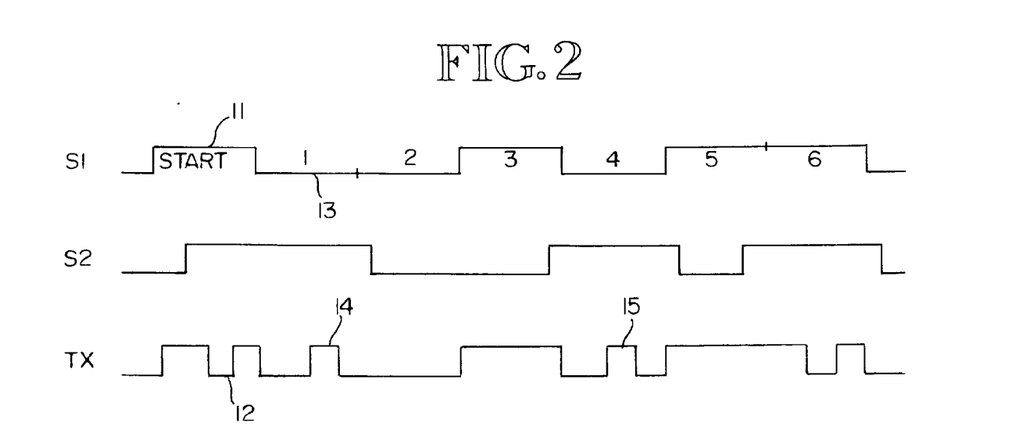

In the present invention, one of the information signals, i.e. the IRIG-B time code, is time-multiplexed into the EIA-232 data. FIGS. 1 and 2 show the basic concept of the time-multiplexing communication system of the present invention. FIG. 1 shows an eight bit data character, with start and stop bits. The "high" level of the character might be represented by a high electrical or light level, and the low by a lower level. Assuming a baud rate of 40,000 bits per second for transmission of characters, one bit interval is 25 microseconds. If the transmission channel has a maximum baud rate of 40,000 bits per second, then the data baud rate must be slowed down if additional information, i.e. the IRIG-B time code, is to be placed into the data stream.

If the data stream is slowed down to 20,000 bits per second, then the bit interval is 50 microseconds, which is twice as long as the minimum bit length for the channel. In FIG. 2, signal S1 has a bit length of 50 microseconds which, for a 40,000 baud channel, is twice as long as the minimum bit length supported by the channel. Signal S2 in FIG. 2 illustrates time code information, although that signal shows many times the number of separate time code bits normally seen within a given indicated time span. This is for illustration of the principles of the invention. Time code pulses typically are at least two milliseconds long, which would be too long to show in FIG. 2, relative to the time duration of the data characters shown in that figure.

Signal TX in FIG. 2 shows the multiplexed encoded output combining the data of signal S1 and the compressed time code information of signal S2 in accordance with the principles of the present invention. The encoding is accomplished as follows. Signal TX begins at a level equal to the level of data signal S1. Thereafter, on a bit-by-bit basis, if the data signal S1 remains at the initial level of each bit, either high or low, for a minimum amount of time from the start of each bit, which in the embodiment shown is selected to be approximately half of the bit interval (although this could be changed to some extent) then signal TX is pulsed to the opposite state or level at that point in time if at that "minimum time" point the time code signal S2 is high. This pulse lasts for approximately 10 microseconds. The termination of the pulse must occur, however, prior to the start of the next bit in the data stream.

While the output signal TX goes to the opposite state if the time code signal is high following the occurrence of a minimum time that each bit remains in its initial state, if the time code signal is low at that point in time, then data signal TX remains in its original state, i.e. there is no pulsing of signal TX to the opposite state. Signal TX thus illustrates the encoding system of the present invention for the eight-bit data character S1 and the "compressed" time code signal S2. For the start bit, note that at the halfway mark 11 for that bit, signal S1 is still high and S2 is high. Hence, the output signal TX is pulsed low at 12, from its original high level. At the end of pulse 12 (10 microseconds), signal TX again goes high, following S1 to the end of the start bit. For bit 1 of signal S1, that bit is low from the beginning of the bit to the midpoint 13 of the bit, at which point S2 is high, so TX is pulsed high at 14. For data bit No. 2, which is low, at the midpoint thereof the time code signal is low, so signal TX remains low. As a further example, bit 4 of S1 is low, and at the midpoint thereof the time code signal is high, resulting in a "high" pulse 15 in the TX signal. Bits 5 and 6 of signal S1 are handled similarly. The 10 microsecond pulses 12, 14 and 15 are referred to as being "injected" or "inserted" into the output signal.

At the receiving end, the data signal is easily regenerated by filling in, i.e. removing, as appropriate, those pulses inserted in the encoding process during the time when the time code signal is present (high). As is evident from the above, the pulses which are inserted at the transmitting end are relatively easy to detect, because they are significantly shorter in duration (10 microseconds) than the minimum time associated with the individual data bits.

The time code signal is regenerated by setting the signal level of the time code generating circuit to a high whenever a narrow (either positive or negative) pulse (the inserted pulse) is detected in the received signal. The signal level is returned to low, on the other hand, when there has been no narrow pulse detected for a period of time equal to approximately three multiples of the minimum time established for the data signal (approximately one-half of a bit interval).

The above encoding system has a number of advantages. First, it is easy to implement, and the EIA-232 data stream can typically be used in its existing form without regard to the particular baud rate. There is no buffering required for either the data stream or the IRIG-B time code, and the data signal is typically subject to only a very small delay time, less than one bit interval typically. Furthermore, the leading edge of the reconstructed time code signal, which indicates time in milliseconds, will have less than one bit interval of error, i.e. jitter. This amounts to approximately 50 microseconds, which is significantly less than the accuracy of most clocks. The trailing edge of the reconstructed time code signal, on the other hand, is not critical to the actual time synchronization; however, its jitter is less than 150 microseconds. The total maximum jitter on the reconstructed time code signal is therefore 200 microseconds, which amounts to only about 10% of the minimum two millisecond pulse width of the IRIG-B time code signal.

As noted above, the transceiver combination described herein comprises a first portion which is a EIA-232 transceiver and an IRIG-B time code transmitter, i.e. it transmits combined EIA-232 data and IRIG-B time code and receives EIA-232 data. The second portion is an EIA-232 data transceiver and an IRIG-B time code receiver. This portion receives the combined EIA-232 data and IRIG-B time code and transmits EIA-232 data. The two portions are connected by a fiber-optic cable. The first portion is hereinafter referred to as the local portion or transceiver, while the second portion is referred to as the remote portion or transceiver.

Figure 3:
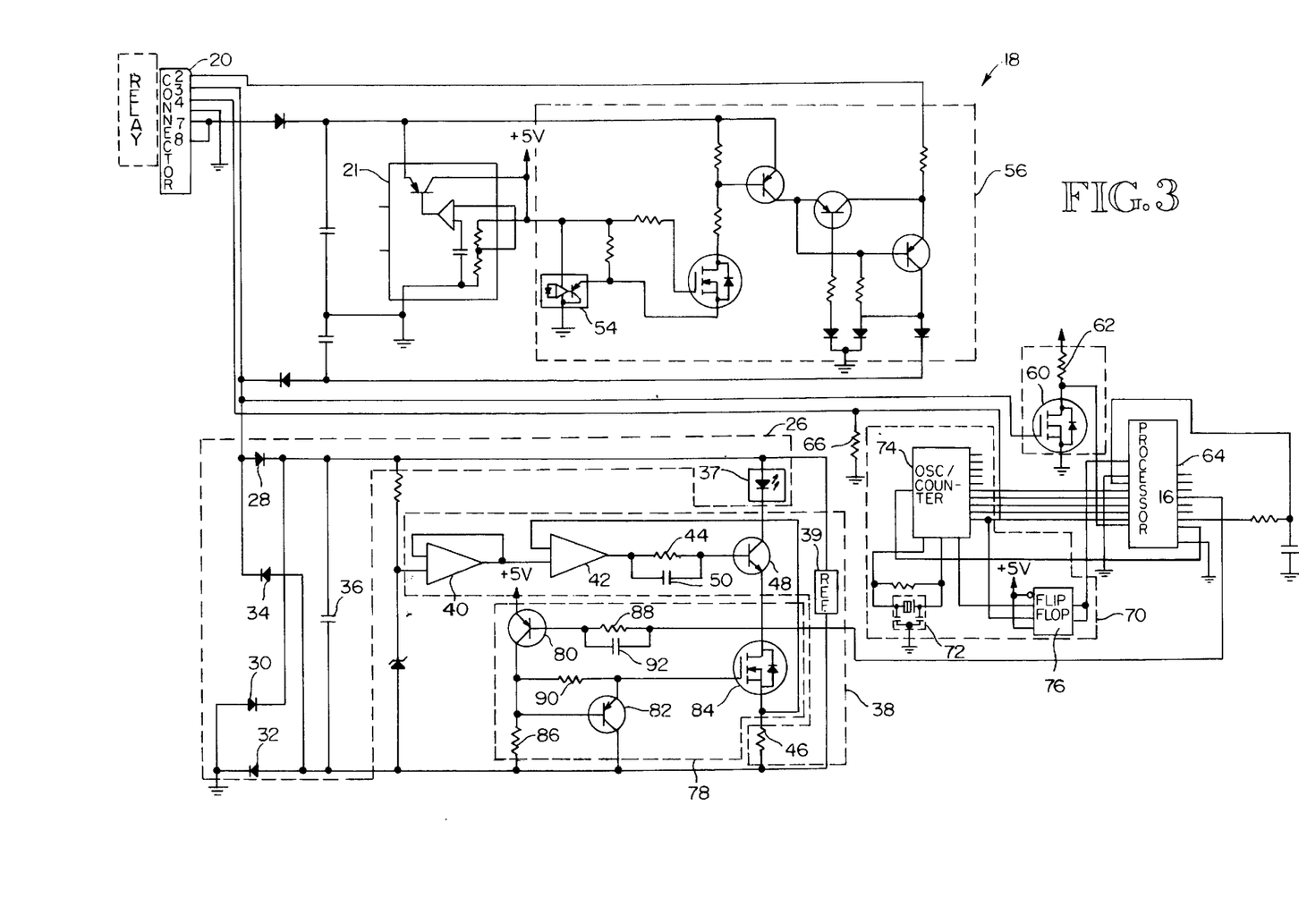
FIG. 3 is a schematic diagram of a fiber-optic data transceiver and IRIG-B time code transmitter of the present invention.
Figure 4:
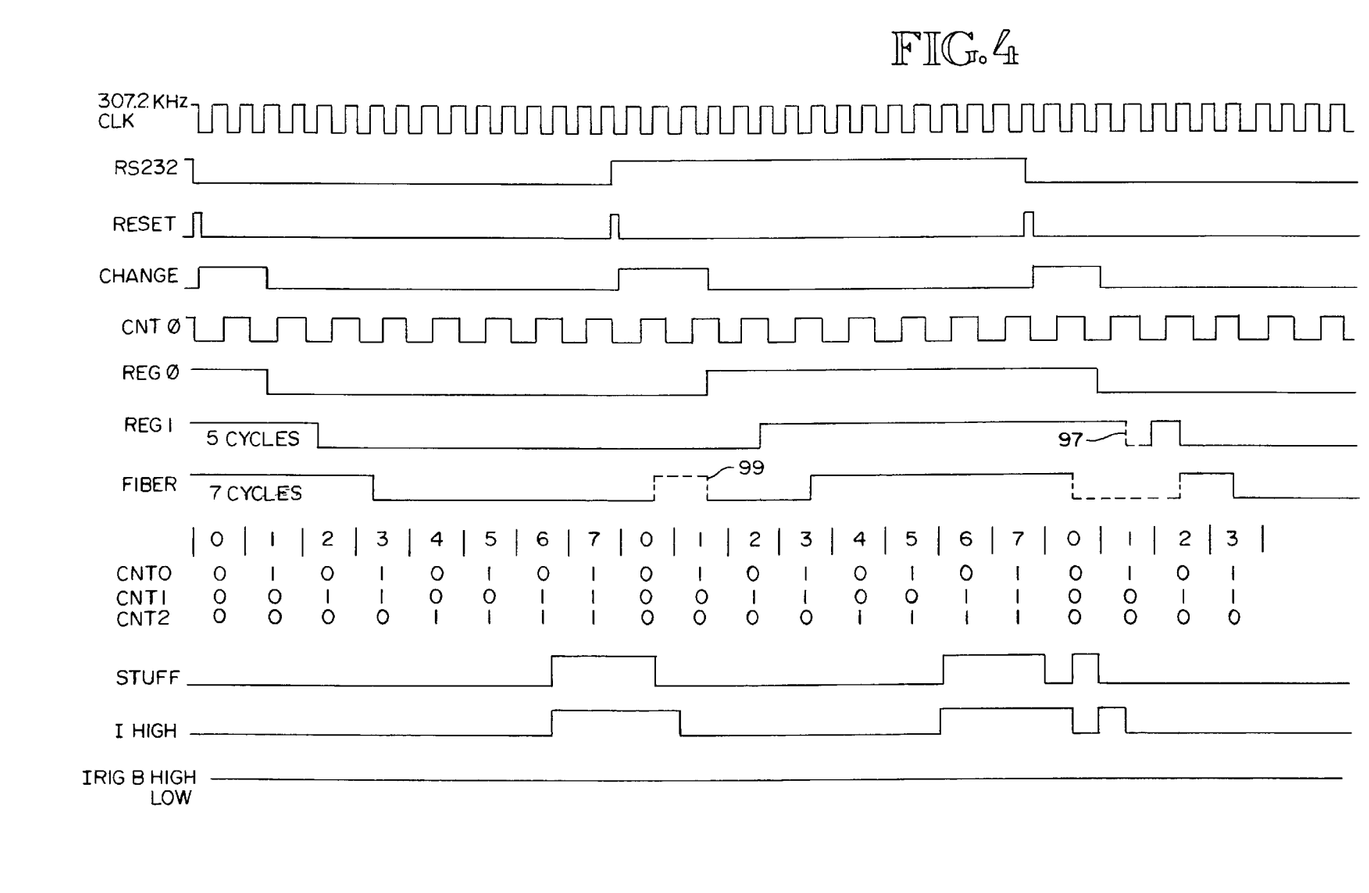
FIG. 4 is a timing diagram for the apparatus of FIG. 3.

FIGS. 3, 4 and 5 relate to the local transceiver. Referring to FIG. 3, the local transceiver 18 is powered through a connector 20, which is plugged into a protective relay associated with the local transceiver The signal on pin 7 of connector 20 drives a 5 volt signal generator circuit 21 which powers the local transceiver 18 and the logic circuits therein, as well as producing the EIA-232 positive level for data received from the remote transceiver, which is present on pin 2 of connector 20 after it has been processed by the local transceiver after being received. In addition, the signal on pin 7 is applied to pin 8 of connector 20, which is then used to drive the "handshaking" function of the EIA-232 interface in the associated protective relay.

The signal on pin 3 of connector 20, from the associated relay, has four purposes. First, the signal levels thereof represent the signal levels of the EIA-232 data which is to be transmitted to the remote transceiver. Second, the signal provides the power to drive the fiber-optic transmitter section shown generally at 26. In the embodiment shown, fiber-optic transmitter 26 includes a full wave bridge rectifier, comprising diodes 28, 30, 32 and 34. The full wave bridge rectifier charges a capacitor 36, the output of which drives the fiber-optic transmitter element 37.

Third, the signal at pin 3 provides the power for the voltage reference circuit, shown generally at 38, which includes a voltage reference element 39. Circuit 38 regulates the current for the fiber-optic transmitter circuit 26, by means of operational amplifiers 40 and 42, resistors 44 and 46, and transistor 48. Capacitor 50 prevents an undesirable low value of current through the fiber-optic transmitter 26 when it first turns on. Fourth, the signal at pin 3 of connector 20 produces the EIA-232 negative level for the received signal from the remote transceiver (pin 2 of connector 20).

The fiber-optic transmitted signal from the remote transceiver is received at the local transceiver 18 by optical receiver element 54, which is part of a received signal processing circuit 56. The remainder of the received processing circuit 56 is used to process the received signal before it is applied to the associated relay via pin 2 of connector 20. The processing circuit 56 is a level converting circuit which produces the EIA-232 data signal transmitted from the remote transceiver, i.e. the reconstructed version of the original EIA-232 data signal present at the remote transceiver. The associated protective relay uses the EIA-232 data in its own signal processing functions.

As indicated above, the local transceiver includes a data transceiver and a time code transmitter. Hence, there is circuitry in FIG. 3 for combining data and time code for transmission. However, as a receiver, it is capable of receiving just data (not data and time code information). The data to be transmitted, which is originated by the associated local protective relay, appears on pin 3 of connector 20, and is combined with the time code, which is on pin 4 of connector 20 from the associated relay in the embodiment shown. Transistor 60 and resistor 62 convert the data signal produced by the associated protective relay to the required zero to five volt levels necessary for processing by the transmit processor 64, which in the embodiment shown is a gate array logic processing circuit which contains and executes the logic equations for combining the data and time code signals. A resistor 66 provides a zero volt reference to pin 3 of the transmit processor 64 in the event that no time code signal is present from the relay. Timer circuitry, shown generally at 70, which comprises a ceramic oscillator 72, an oscillator/counter 74 and a flip-flop 76, produces the timing signals for the transmit processor 64.

The combined data/time code output signal which is to be transmitted to the remote transceiver appears on pin 16 of processor 64. This signal is applied to an output level converter circuit shown generally at 78, which includes transistors 80, 82 and 84, resistors 86, 88 and 90, and a capacitor 92. Transistor 84 turns the current on and off through the fiber-optic transmitter 37.

The combined output signal, which is transmitted over the fiber-optic connecting cable to the remote transceiver, contains the multiplexed data and time code information. FIG. 4 shows the timing diagram for the local transceiver, while FIG. 5 shows a set of logic equations used in the processor 64 to produce the combined output signal.

Referring specifically now to FIG. 4, it shows a clock signal (CLK) which in the embodiment shown has a frequency of 307.2 kHz. This signal, as indicated above, is generated by timing circuit 70 and provided to the transmit processor 64 as a reference signal for the processing of the logic equations. Signal RS-232 represents the transmitted data from the associated protective relay. This signal drives the gate of transistor 60. The transistor 60 inverts the data signal and applies it to pin 2 of transmit processor 64. As discussed above, whenever the time code signal to be transmitted is low, the data signal is simply passed through, forming the output signal, following a delay of either seven or eight clock cycles, depending upon the polarity of the data signal bit transition. On the other hand, when the time code signal goes high, a pulse opposite in polarity to the data signal is injected into the output signal, at approximately at least halfway through each bit interval.

Accordingly, the data signal must have been in a particular state (high or low) for an amount of time approximately equal to the minimum bit interval of the fiber-optic connecting channel to permit the injection of a pulse. A 40 kHz baud rate for a particular channel, for instance, corresponds to a minimum bit interval of 25 microseconds, i.e. about eight clock pulses. In addition, the output signal, as indicated above, is delayed, which in the embodiment shown is necessary so that there is sufficient time to inject the time code signal pulse before the output signal is due to change state because of a change in the data signal. Accordingly, the data signal must have bit intervals sufficiently longer than the channel rate to permit the time necessary to inject the time code pulses.

In addition to the above, there are a number of other signals which operate in the processor 64. The "reset" signal is a pulse which occurs each time that the RS-232 data changes states. The "change" signal goes high in response to the reset pulses. When the RS-232 data signal goes low, the pulse width of the change signal is three clock cycles, while when the data signal goes high, the pulse width of the change signal is four clock cycles. The difference of one clock cycle compensates for the pulse distortion introduced by the fiber-optic channel itself. The distortion tends to increase during the "on" transition of the light signal more than the "off" transition.

The CNT0 signal is one-half the frequency of the clock signal. The REG0 signal is identical to the RS-232 data signal, except that it is delayed by the time interval that the change signal of FIG. 4 remains high. Signal REG1 is the same as REG0, except it is delayed by two additional clock cycles. When the time code signal is high and REG1 is high, a negative pulse of one clock cycle occurs near the end of the high REG1. However, this single negative pulse which is shown dotted at 97 is inconsequential to the operation of processor 64.

The output signal designated "fiber" in FIG. 4 is the actual transmitted combined data and time code signal. The fiber signal is delayed relative to the REG1 signal by two additional clock cycles as well as including the injected pulses because of the time code signal. These injected pulses are shown dotted in the fiber signal. The signals designated CNT1, CNT2 and CNT3 have logic levels as shown. Signal CNT1 is one-half the frequency of CNT0, while CNT2 is one-half the frequency of CNT1, and CNT3 is one-half the frequency of CNT2.

The output signal labeled "stuff" in FIG. 4 goes high as soon as the RS-232 data signal has been in a steady state during any bit interval long enough to qualify for an injection of a pulse if the time code signal (IRIG-B) is high. This period of time in the embodiment shown is eight clock cycles when the data signal is low, and the inserted pulse is to go high, and six clock cycles if the data signal is high and the inserted pulse is to go low. These differing times compensate for the pulse distortion.

The output signal labeled "I high" contains the IRIG-B time code signal, but slightly modified. The I high signal is low whenever the time code signal is low and is high when both the IRIG-B signal and the "stuff" signal are both high.

Still referring to FIG. 4, the first bit of the RS-232 data signal is low. After at least eight clock pulses have passed (approximately one-half the bit interval), a positive pulse is inserted, since the IRIG-B signal is high. This inserted pulse 99 is shown dotted in the fiber signal. Two clock cycles comprise the length of the inserted pulse in the embodiment shown. If the IRIG-B signal were not high, there would not be an injected pulse and the first fiber signal bit would be identical to the RS-232 data bit, delayed by the seven cycles. The second bit in the RS-232 data stream is high. Since the data signal during this bit is high for at least six clock pulses (the minimum for low to high transition), the presence of a high IRIG-B signal at that point in time results in a four clock cycle negative pulse being inserted, as shown by the dotted pulse 102 in the fiber signal.

In summary, for the transceiver of FIG. 2, the output signal "fiber" is the same as the RS-232 data signal, with a specific delay time (seven cycles) and inserted pulses for the time code signal where appropriate. As indicated above, the inserted pulses are of opposite polarity and are optimized in length to compensate for the pulse distortion of the channel.

Figure 6:
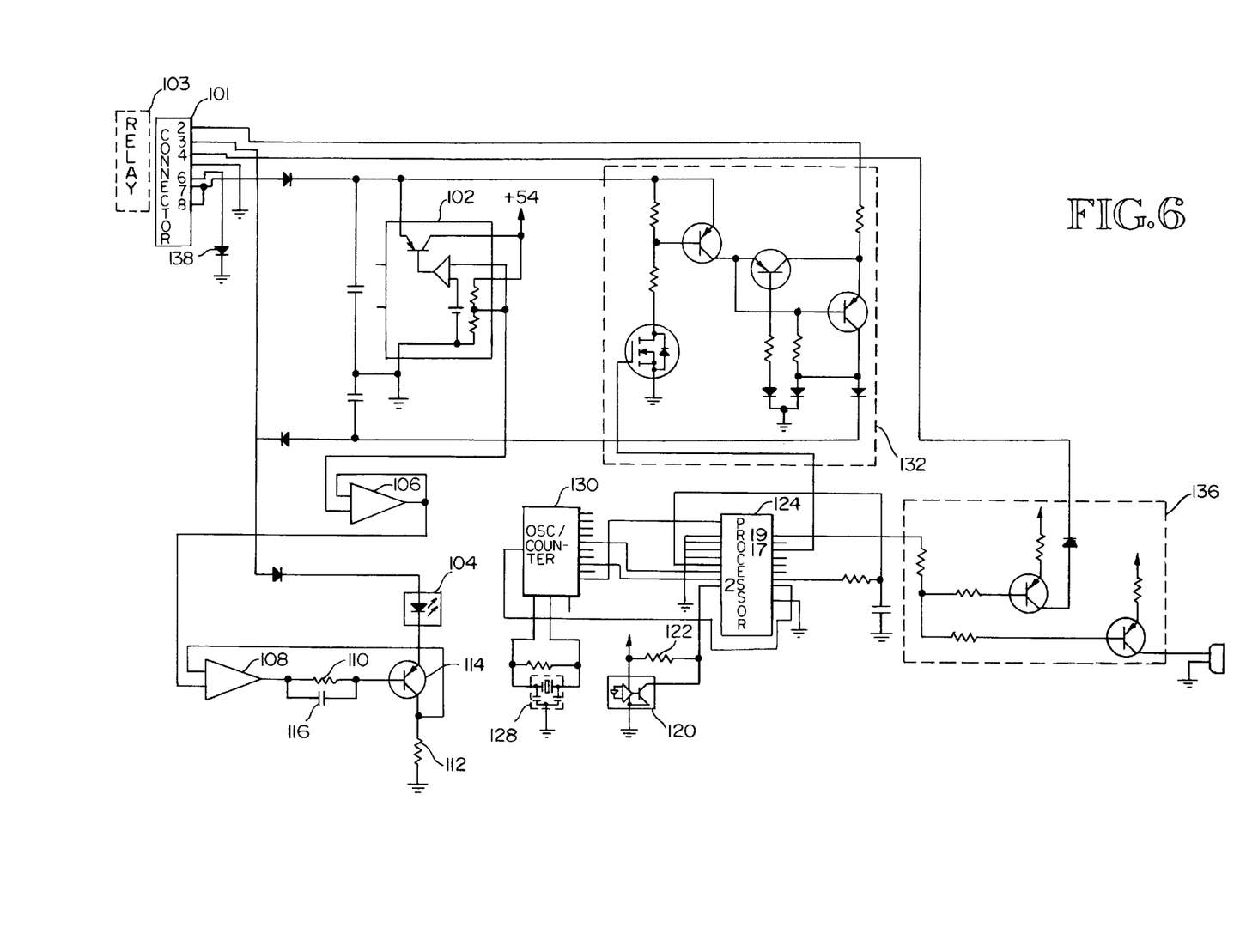
FIG. 6 is a schematic of a data transceiver and IRIG-B time code receiver of the present invention.

FIG. 6 shows the remote transceiver portion of the invention, which in the embodiment shown includes a capability for receiving the combined data and time code information and for transmitting data. The remote transceiver receives its power from pins 3 and 7 of connector 101 from its associated protective relay 103. The signals on pin 7 of connector 101 have the same function as the signals on pin 7 of the connector of the local transceiver. A reference voltage from circuit 102 is used to regulate the transmitter current of the fiber-optic transmitter 104 through operational amplifiers 106 and 108. On pin 3 of connector 101 is the data to be transmitted from the associated relay 103 to the local transceiver. When the data signal to be transmitted is high, current flows through transmitter 104. Operational amplifiers 106 and 108 regulate the current, along with resistors 110 and 112 and transistor 114. Capacitor 116 prevents an under-current condition through the fiber-optic transmitter 104 when it first turns on.

As discussed in detail above, the local transceiver produces a fiber-optic signal which has combined data and time code information. This combined signal is applied over a connecting fiber-optic line and is received by optical receiver 120 in the remote transceiver. The output of the optical receiver 120, with resistor 122, produces the signal input to the processor 124. The logic equations in processor 124 decode the received signal into its separate data and time code components. These two signals are identical to, i.e. replicas of, the data and time code signals which were combined and then transmitted by the local transceiver. The logic equations are shown in FIG. 8. The individual components of the logic signals will be explained in more detail below in connection with the timing diagram of FIG. 7.

As described above, ceramic resonator 128 and oscillator/counter circuit 130 produce the timing signals for the processor 124. The data output from processor 124 appears on pin 17. A level converting circuit shown generally at 132 processes the data signal and applies it to pin 2 of connector 101 for use by the associated relay 103. The time code signal appears on pin 19 of processor 124. Circuit 136 and diode 138 form a constant current source which drives an IRIG-B circuit connected to pins 4 and 6 of connector 101.

Figure 7:
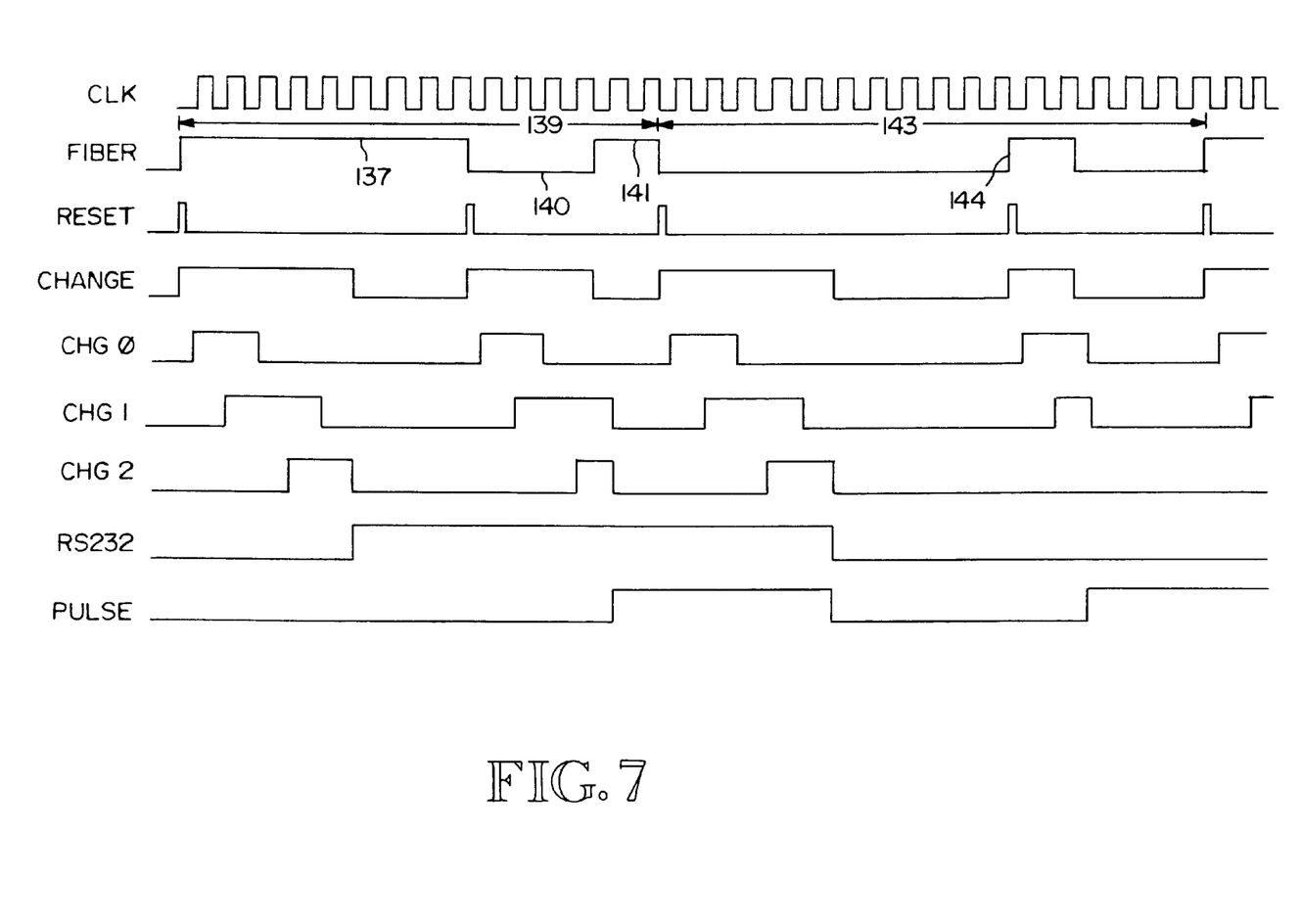
FIG. 7 is a timing diagram of the apparatus of FIG. 6.
Figure 8:
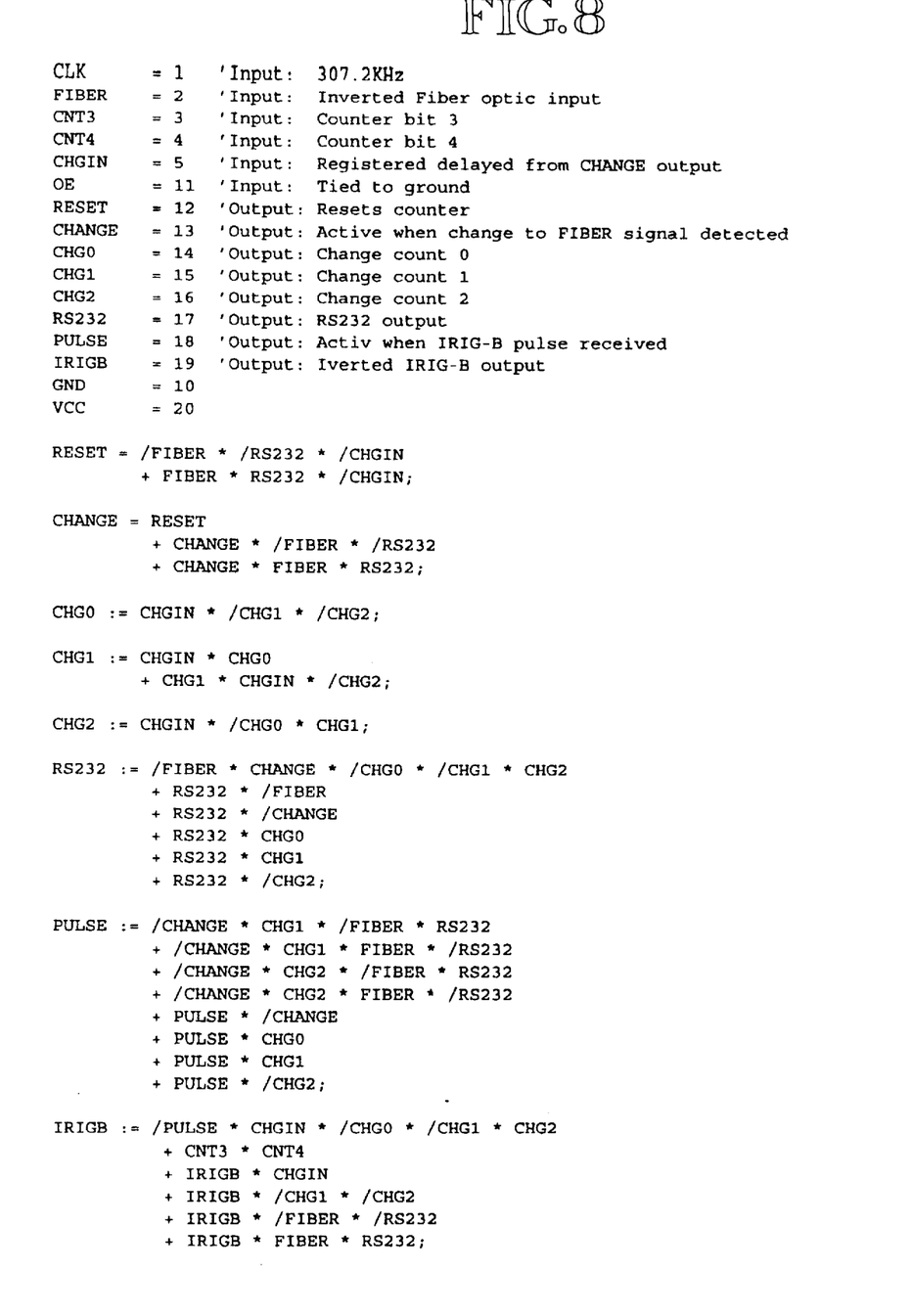
FIG. 8 is a set of logic equations used in the apparatus of FIG. 6.

The timing diagram for the remote transceiver is shown in FIG. 7. The clock signal is similar to the clock signal for the local transceiver, i.e. in the embodiment shown, 307.2 kHz. As discussed above, this clock signal is generated by ceramic resonator 128 and oscillator 130 and is provided to the processor 124. The "fiber" signal is the received signal from optical receiver 120, i.e. the transmitted "fiber" signal of FIG. 4.

In order to produce the data signal, any pulses which are detected in the fiber signal which have a shorter duration, in the embodiment shown, than 5.5 clock cycles will be "filled in", i.e. those short pulses are in effect eliminated from the fiber signal. Further, whenever a short duration pulse is detected the time code signal output at pin 19 goes high and stays high until no short pulses have been detected for 18 consecutive clock cycles. Separate data and time code signals which are accurate replicas of those signals present at the local transceiver thus appear at pins 17, 19 of the processor.

The data output signal is delayed relative to the fiber signal input at pin 2 by 5.5 clock cycles, which allows the time code injected pulses to be eliminated from the fiber signal when and if detected. If no time code injected pulses are present during a particular bit interval, the resulting data signal for that bit is merely a delayed replica of the fiber signal for that bit.

Referring again to the time code diagram of FIG. 7, the signal referred to as "reset" is a pulse which occurs at the time that the fiber signal changes state, either due to a change in the data state or to an injected time code pulse.

The signal referred to as "change" goes high in response to each reset pulse. The width of each change pulse is 5.5 clock cycles for those fiber bit intervals in excess of 5.5 clock cycles. Otherwise, the width of the change pulse is equal to the width of the injected time code pulse.

Signals CHG0, CHG1 and CHG2 are used to time the 5.5 clock cycle sequence, which starts over whenever a time code injected pulse has been filled in during the reconstruction of the data signal.

The "pulse" signal in FIG. 7 goes high whenever a fiber signal transition of less than 5.5 clock cycles, i.e. the time code injected pulse, is detected. This signal as well as the fiber signal are thus used to generate the output time code signal.

Referring now to the first "high" portion 137 of the fiber signal of the first bit 139, this first portion is longer than 5.5 clock cycles so that it is passed on as the actual data (RS-232) output. The next portion of the first bit is low and is shorter than 5.5 clock cycles, which indicates the presence of an injected time code pulse during the first data bit. This injected pulse 140 is eliminated so that it does not appear in the RS-232 data signal. The remainder 141 of the fiber signal for the first bit (the high portion following the injected pulse) is a continuation of the initial high portion of the bit, i.e. as if the time code injected pulse had never been there.

For the next bit 143 interval of the fiber signal; which is low, there is an injected high pulse 144, which is filled in and hence does not appear in the RS-232 output signal. This process of evaluating the fiber signal input relative to the presence of short duration pulses continues until the fiber signal has been completely decombined into its data and time code signals. The data signal is applied to and used by the associated protective relay 103 while the IRIG-B time code is also used by the relay 103 and other equipment connected to the relay.

Hence, a fiber-optic transceiver arrangement has been disclosed in which both local and remote units have the capability of transmitting data information. In the specific embodiment shown, the local transceiver has the capability of combining data with time code information and transmitting that via a fiber-optic communication link to the remote transceiver, which is capable of decombining the two signals into their respective time code and data portions. In addition, the local transceiver has the capability of receiving data information transmitted by the remote transceiver. Alternatively, it should be understood that both the local and the remote units could have the capability of combining and transmitting both data and time code information as well as receiving and decombining such a combined signal.

Although a preferred embodiment of the invention has been disclosed herein for illustration, it should be understood that various changes, modifications and substitutions may be incorporated in such embodiment without departing from the spirit of the invention, which is defined by the claims which follow.

What is claimed is:

1. A transceiver for use with a fiber-optic communication means for communication of data and time code information, comprising;

means for at least one of the following: (a) transmitting combined data and time code information over the fiber-optic communication means and (b) receiving combined data and time code information from the fiber-optic communication means;

wherein the transmitting means includes means for combining the data and time code information prior to transmission and further includes means for receiving data from the fiber-optic communication means, wherein the means for combining data and time code information includes means for time multiplexing the data with the time code information, the multiplexing means including means for injecting a pulse into each data bit following the occurrence of a minimum time interval from a beginning of each data bit when a time code pulse is present at said minimum time, and for passing each data bit as is when there is no time code pulse present at said minimum times wherein the injected pulse has a smaller time duration than the time duration of a data bit and the time code information rate is substantially slower than the rate at which the injected pulse is injected into the data bits; and wherein the means for receiving combined data and time code information includes means for separating the received combined data and time code information into replica versions of transmitted data and time code information, including means for detecting and removing any injected pulses in the received combined data and time code information and for reconstructing the time code information by initiating a time code pulse whenever the means for receiving combined data and time code information detects injected pulses in the received combined data and time code information, and for terminating the time code pulse when no injected pulses are detected for a specified period of time, and further includes means for transmitting data over the fiber-optic communication means.

2. A system of claim 1, wherein the fiber-optic communication means comprises a single channel.

3. A system of claim 1, wherein the transceiver includes means for producing and transmitting combined data and time code information and receiving combined data and time code information and decombining them into replica versions of the original data and time code.

4. A system of claim 1, wherein the minimum time is at least 50% of the bit interval.

5. A system of claim 1, wherein the injected pulse has a level opposite to that of the data.

6. A system of claim 1, wherein the specified period of time is approximately three times the minimum time interval.

7. A transceiver for use with a communication line for communication of first and second data information, comprising:

means for at least one of the following: (a) transmitting combined first and second data information over the communication line and (b) receiving combined first and second data information from the communication line;

wherein the transmitting means includes means for combining the first and second data information prior to transmission and further includes means for receiving at least the first data from the communication line, wherein the means for combining the first and second data information includes means for time multiplexing the first data with the second data, the multiplexing means including means for injecting a pulse into each data bit of the first data following the occurrence of a minimum time interval from a beginning of said each data bit when a second data pulse is present at said minimum time, and for passing each data bit of the first data when there is no second data pulse present at said minimum time, wherein the injected pulse has a smaller time duration than the time duration of the first data bits and the second data rate is substantially slower than the rate at which the injected pulse is injected into the first data bits; and wherein the means for receiving combined first and second data information includes means for separating the received first and second data information into replica versions of transmitted first and second data information, including means for detecting and removing any injected pulses in the received combined first and second data information and for reconstructing the second data information by initiating a reconstructed second data pulse whenever the receiver detects injected pulses in the received combined first and second data information, and for terminating said reconstructed second data pulse when no injected pulses are detected for a specified period of time, and further includes means for transmitting at least the first data information over the communication line.

8. A system of claim 7, wherein the minimum time is at least 50% of the bit interval of the first data.

9. A system of claim 7, wherein the injected pulse has a level opposite to that of the first data bits.

* * * * *